(12) United States Patent
Miyabayashi

(10) Patent No.: US 6,830,289 B2
(45) Date of Patent: Dec. 14, 2004

(54) FRONT STRUCTURE OF VEHICLE

(75) Inventor: Kazushige Miyabayashi, Tokyo (JP)

(73) Assignee: Fuji Jukogyo Kabushiki Kaisha (JP)

(*) Notice: Subject to any disclaimer, the term of this patent is extended or adjusted under 35 U.S.C. 154(b) by 0 days.

(21) Appl. No.: 10/749,503

(22) Filed: Jan. 2, 2004

(65) Prior Publication Data
US 2004/0140694 A1 Jul. 22, 2004

(30) Foreign Application Priority Data
Jan. 8, 2003 (JP) .................................. 2003-002018

(51) Int. Cl.[7] .............................................. B62D 25/20
(52) U.S. Cl. ............................ 296/193.07; 296/193.09
(58) Field of Search ...................... 296/193.07, 193.09, 296/198, 75, 1.03

(56) References Cited

U.S. PATENT DOCUMENTS

| | | | | |
|---|---|---|---|---|
| 5,611,593 A | * | 3/1997 | Fukagawa et al. | 296/193.07 |
| 6,145,923 A | * | 11/2000 | Masuda | 296/1.03 |
| 6,250,710 B1 | | 6/2001 | Matsuzaki | |
| 6,460,918 B1 | * | 10/2002 | Sato et al. | 296/193.06 |
| 6,722,696 B2 | * | 4/2004 | Sonomura et al. | 280/784 |
| 2002/0063445 A1 | * | 5/2002 | Takeuchi | 296/204 |
| 2003/0011184 A1 | * | 1/2003 | Sonomura et al. | 280/784 |
| 2004/0056515 A1 | | 3/2004 | Nomura | |

FOREIGN PATENT DOCUMENTS

| | | |
|---|---|---|
| JP | 1986-159286 | 10/1986 |
| JP | 1994-329045 | 11/1994 |

OTHER PUBLICATIONS

Copy of U.S. Appl. No. 10/757,412, filed Jan. 15, 2004.

* cited by examiner

Primary Examiner—Jason Morrow
(74) Attorney, Agent, or Firm—Smith, Gambrell & Russell, LLP

(57) ABSTRACT

A front structure of a vehicle includes a toe board, a pair of front side frames extending in a lengthwise direction of the vehicle, a toe board cross member extending in a widthwise direction of the vehicle so as to connect the front side frames with each other, the toe board cross member and the toe board defining a structure having a dosed cross section, and front suspension member supports provided on the front side frames, the toe board cross member extending to positions in the vicinity of the front suspension member supports.

8 Claims, 6 Drawing Sheets

Prior Art

FRONT STRUCTURE OF VEHICLE

BACKGROUND OF THE INVENTION

1. Field of the Invention

The present invention relates to a front structure of a vehicle, more specifically to a front structure of a vehicle comprising a toe board cross member which forms a closed cross section by cooperation with a toe board.

2. Discussion of the Related Art

A front structure of a vehicle comprises a toe board provided at a front part of the vehicle by extending in a widthwise direction of the vehicle for partitioning an engine compartment and a passenger compartment, and left and right front side frames, each extending in a lengthwise direction of the vehicle. The side frames are provided at a front part of the vehicle, and a part of the side frames are first brought into contact with the toe board, and then bent in a lower direction. The side frames extend to a lower surface of a floor of the vehicle. Heretofore, front suspension members are supported by the front side frames having such structure. Such technology is disclosed, for instance, in Japanese Patent Kokai Publication 6 (1994)-329045, FIG. 1.

FIG. 7 is a vertical cross section for explaining a prior art structure. The figure shows a front side frame 100 at a part corresponding to a front suspension member support portion 102. The cross section of the front side frame 100 viewed from the front or rear part of the vehicle body has approximately a U-shape. The front side frame 100 is connected to a toe board 110 via a flange provided on an upper part of the front side frame 100. Accordingly, the front side frame 100 and the toe board 110 form a closed cross section extending in a longitudinal direction of the vehicle. The supporting portion 102 is provided on a bottom wall 101 of the front side frame 100. Thus, a rear part of a front suspension member 103 is supported by the front side frame 100 via the front suspension member support portion 102.

Moreover, it is possible to provide a toe board cross member in front of a toe board. In this case, a structure with a closed cross section extending in a widthwise direction of a vehicle is formed by cooperation of the toe board cross member with the toe board. Left and right front side frames are connected by the structure with a closed cross section, whereby the rigidity of the front structure of the vehicle is increased, as is disclosed, for instance, in Japanese Utility Model Kokai Publication 61 (1986)-159286, FIGS. 1 and 2.

When a vehicle turns a corner, force in a widthwise direction of the vehicle is applied to the front suspension sub-frames 103. Then, the force is successively transmitted to the support portion 102 and the front side frames 100. Accordingly, such force F applied in the direction of the vehicle width may cause a slight deformation of the closed cross section in the widthwise direction as shown by a chain double-dashed line. The slight deformation can cause the geometry of the front suspension members to change. Namely, the driving stability of the vehicle can be affected by the deformation.

The conventional structures with the closed cross sections absorb flexion or distortion relatively caused between the left and right front side frames. However, it is impossible to prevent the structure with the closed cross section itself from being subjected to the slight deformation caused by a force applied in the widthwise direction of the vehicle.

OBJECT AND SUMMARY OF THE INVENTION

It is therefore an object of the present invention to provide a front structure of a vehicle which improves the rigidity of the vehicle in the vicinity of front suspension member support portions, and hence prevents front suspension members from changing geometry and increases driving stability of the vehicle. The invention includes a toe board extending in a widthwise direction of the vehicle, the toe board being provided in a front part of the vehicle for partitioning an engine compartment containing a power unit therein and a passenger compartment, a pair of front side frames provided by being spaced apart from each other in a widthwise direction of the vehicle, the front side frames extending in a lengthwise direction from a front part of the vehicle to a lower surface of a floor of the passenger compartment, the front side frames being downwardly bent when contacting the toe board, a toe board cross member extending in a widthwise direction of the vehicle between the front side frames so as to connect the front side frames with each other, the toe board cross member and the toe board defining a structure having a closed cross section, and front suspension member supports provided on the front side frames, the toe board cross member extending to positions in the vicinity of the front suspension member supports.

Another object of the present invention is to provide a front structure of a vehicle which further improves the rigidity of the vehicle in the vicinity of front suspension member support portions, and hence prevents front suspension members from changing geometry and further increases the driving stability of the vehicle. The invention includes a toe board extending in a widthwise direction of the vehicle, the toe board being provided in a front part of the vehicle for partitioning an engine compartment containing a power unit therein and a passenger compartment, a pair of front side frames provided by being spaced apart from each other in a widthwise direction of the vehicle, the front side frames extending in a lengthwise direction from a front part of the vehicle to a lower surface of a floor of the passenger compartment, the front side frames being downwardly bent when contacting the toe board, a toe board cross member extending in a widthwise direction of the vehicle between the front side frames so as to connect the front side frames with each other, the toe board cross member and the toe board defining a structure having a closed cross section; and front suspension member supports provided on the front side frames, the toe board cross member connecting the front suspension member supports to each other.

A further object of the present invention is to provide a front structure of a vehicle which prevents the toe board from directly receiving an impact load when the impact load is applied to the vehicle, and minimizes deformation of the front suspension members in a widthwise direction of the vehicle when a force is applied in a widthwise direction, and hence prevents the front suspension members from geometry change and increases driving stability of the vehicle. The invention includes an upper member forming a closed cross section extending in a widthwise direction of the vehicle, the upper member being interposed between the toe board and each of the front side frames at positions where the front side frames are brought into contact with the toe board, and a lower member forming a closed cross section extending in a widthwise direction of the vehicle at a position lower than the upper member, the lower member connecting the positions in the vicinity of the front suspension member supports to each other, or the lower member connecting the front suspension member supports to each other.

Still another object of the present invention is to provide a front structure of a vehicle which absorbs vibration transmitted from the power unit, disperses the vibration, and controls noise generation caused by the vibration wherein the toe board cross member supports a rear part of the power unit provided in the engine compartment. The rigid structure with the closed cross section supports the power unit.

BRIEF DESCRIPTION OF THE DRAWINGS

A more complete appreciation of the invention and many of the attendant advantages thereof will be readily perceived as the same becomes better understood by reference to the following detailed description when considered in connection with the accompanying drawings, wherein.

DETAILED DESCRIPTION OF THE INVENTION

Other features of the invention will become understood from the following description of exemplary embodiments, which are given for illustration of the invention and are not intended to be limiting thereof.

Figure 1:
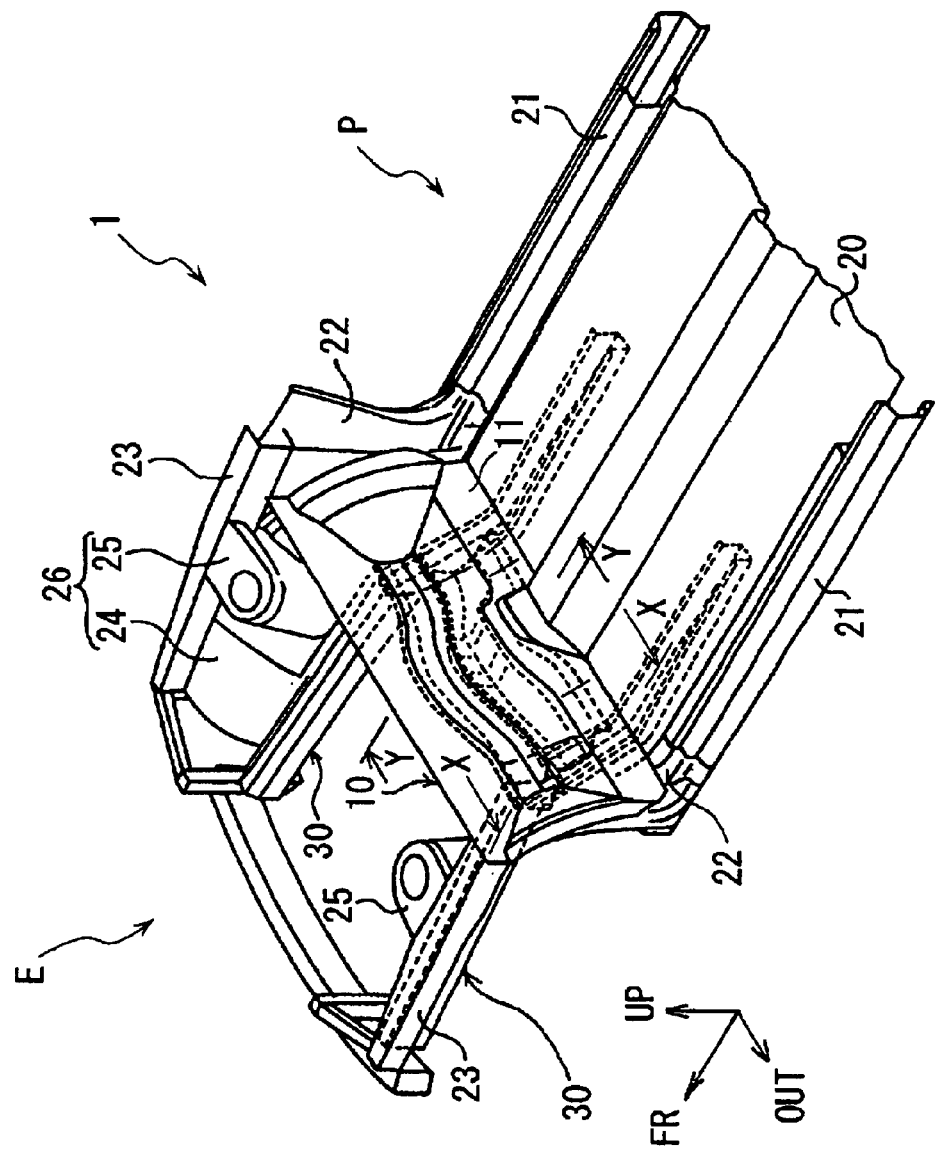
FIG. 1 is a perspective view of a front structure of a vehicle according to the present invention.
Figure 2:
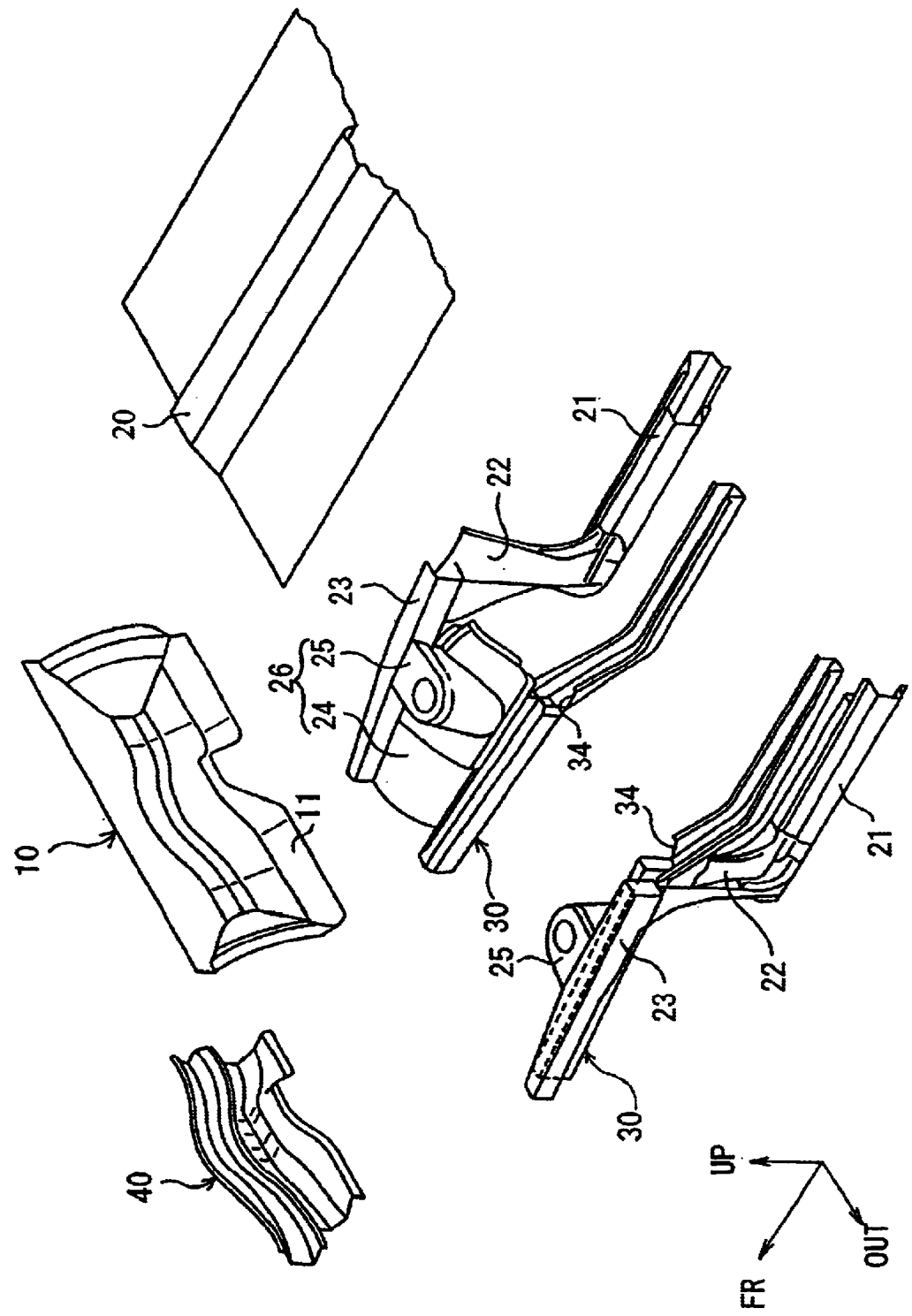
FIG. 2 is an exploded view of the front structure in FIG. 1.
Figure 3:
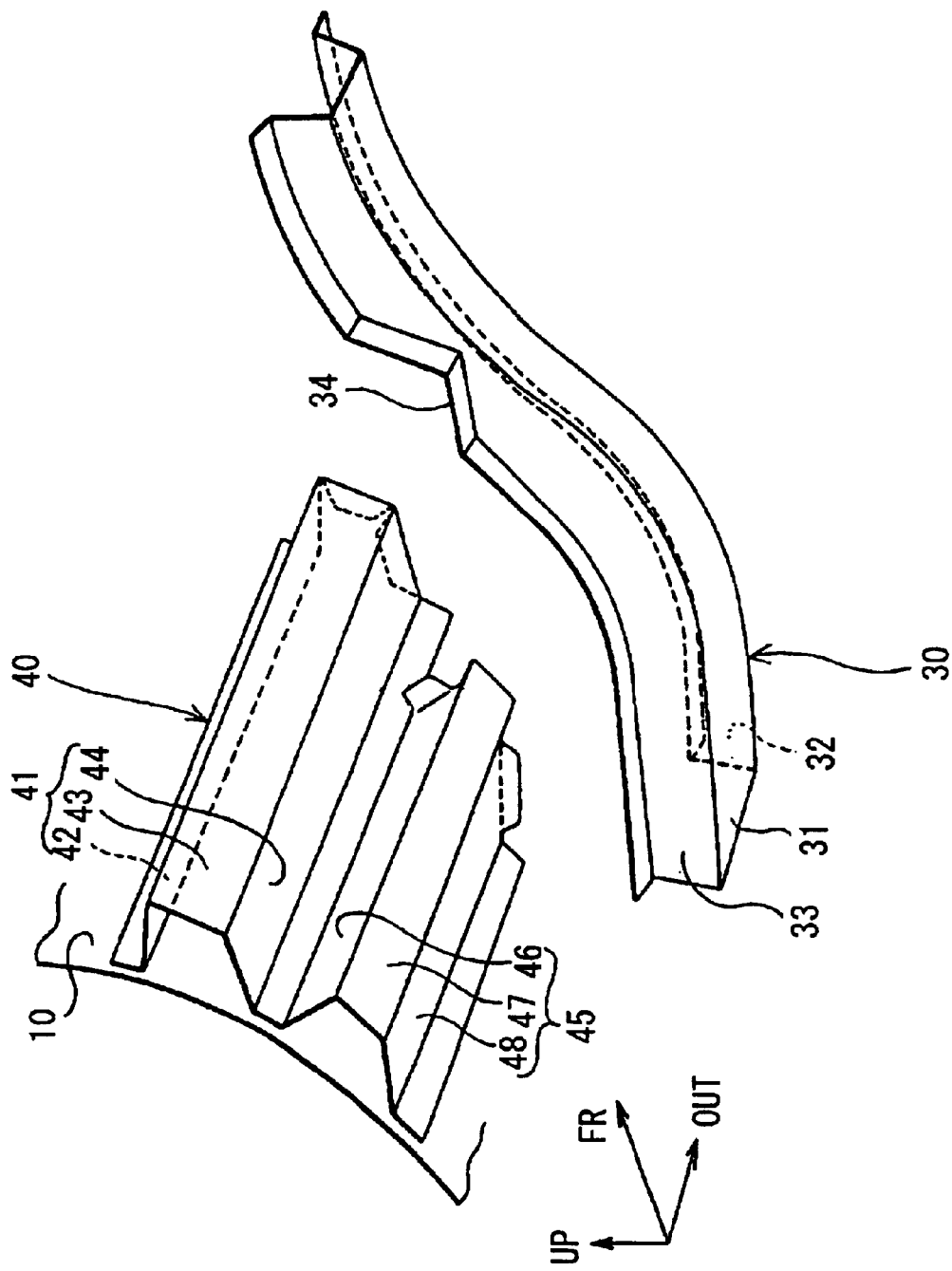
FIG. 3 is an exploded perspective view of a toe board seen from a back lower side of a vehicle toward a rear part thereof.
Figure 4:
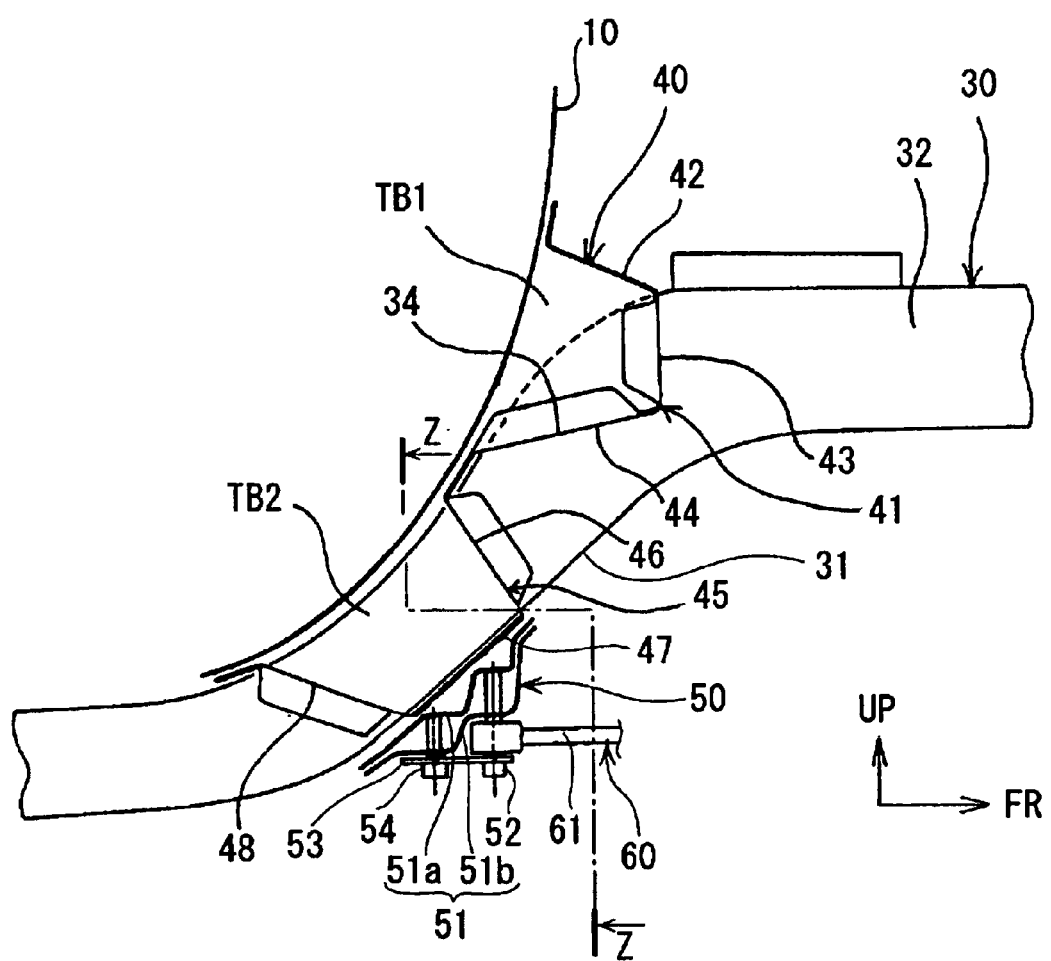
FIG. 4 is a view of the front structure shown in FIG. 1 seen in the direction of arrows X-X in FIG. 1.
Figure 5:
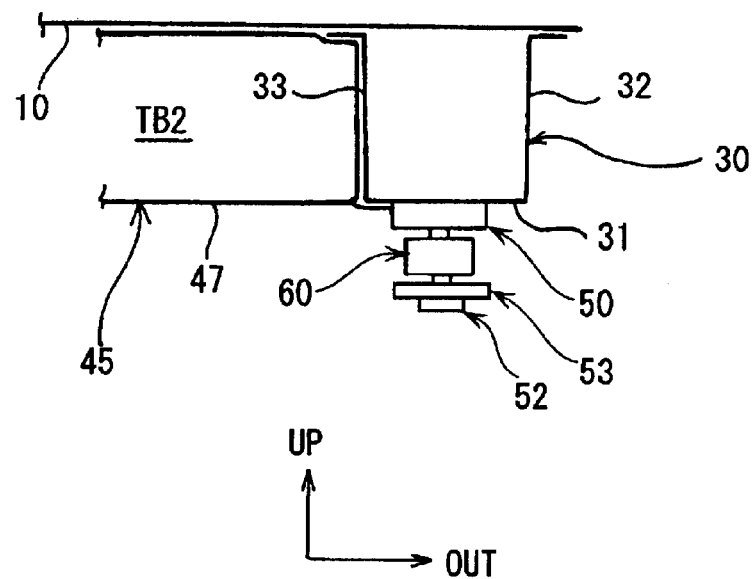
FIG. 5 is a view of the front structure shown in FIG. 4 seen in the direction of arrows Z-Z in FIG. 4.

FIG. 1 is a perspective view of a front structure of a vehicle according to the present invention for showing the front structure obliquely seen from the back toward the front. FIG. 2 is an exploded view of the front structure of FIG. 1. FIG. 3 is an exploded perspective view of a toe board 10 and a front side frame 30 seen from a lower back side of a vehicle to the rear part of the vehicle. FIG. 4 is a view of the front structure shown in FIG. 1 seen in the direction of arrows X-X in FIG. 1. FIG. 5 is a view of the front structure shown in FIG. 4 seen in the direction of arrows Z-Z in FIG. 4. In the figures, arrows FR, OUT and UP respectively show a frontal direction, a widthwise direction, and an upper direction of a vehicle. In the figures, same reference numerals denote identical members in the present invention.

As shown in FIGS. 1, 2 and 4, a toe board 10 extending in a widthwise direction of a vehicle partitions a vehicle body into an engine compartment E and a passenger compartment P. The toe board 10 is approximately vertically provided between the engine compartment E and the passenger compartment P. A lower part of the toe board 10 is formed as an inclining part 11 which downwardly inclines towards a rear part of the vehicle. The lower end of the inclining part 11 is connected to a front part of a floor panel 20. Side sills 21 extend along both lateral ends of the floor panel 20, and front pillars 22 are positioned in front of the side sills 21. Front uppers frames 23 extend from the front pillars 22 toward a front part of the vehicle. Rear ends of the front upper frames 23 are connected to the front pillars 22 at a predetermined height. A pair of front side frames 30 extend approximately in parallel with the front upper frames 23 so as to be provided at inner lower parts with respect to both of the upper frames 23. Front aprons 26 containing wheel arches 24 and strut towers 25 are provided between the front upper frames 23 and the front side frames 30.

The front side frames 30 extend in a lengthwise direction of the vehicle at a former part of the vehicle with respect to the toe board 10. The front side frames 30 are downwardly bent along the toe board 10 and extend rearwardly beyond the toe board 10. The front side frame 30 has a cross section approximately in the form of a U shape as shown in FIGS. 3 and 5. The front side frame 30 has a bottom wall 31, and an outer lateral wall 32 and an inner lateral wall 33 which are provided at outer and inner positions with respect to the width of the vehicle. The outer and inner lateral walls 32 and 33 extend from the bottom wall 31 in an upper direction, and oppose each other. The inner and outer lateral walls 32 and 33 have flanges at upper ends thereof. The flanges are connected to the inclining part 11 of the toe board 10 and a lower surface of the floor panel 20. Accordingly, structures with closed cross sections are formed by the cooperation of the toe board 10, the floor panel 20 and the front side frames 30.

FIGS. 2, 3 and 4 show that the inner lateral walls 33 of the front side frames 30 have notches 34 therein. The notches 34 are formed by removing parts of the inner lateral walls 33. The notches 34 are formed to have triangular shapes which fit with front and lower surface s 43 and 44 of a toe board cross member 40, which will be explained later.

As shown in FIG. 4, a front suspension member support 50 is provided below the notch 34 of the front side frame 30. The front suspension member support 50 includes a bracket 51, a supporting bolt 52, a plate member 53 and a fixing bolt 54. More precisely, the bracket 51 is fixed to the bottom wall 31 of the front side frame 30. The supporting bolt 52 penetrates a rear part of a front suspension member 60 so as to have a bolt head below the bracket 51. Furthermore, the rear part of the front suspension member 60 is held between the bracket 51 and the plate member 53. The plate member 53 is fixed to the bracket 51 by the bolt 54. The bracket 51 has a closed cross section formed by an upper bracket 51a and a lower bracket 51b. Therefore, the supporting bolt 52 is supported with high rigidity.

Furthermore, a toe board cross member 40 is installed on a front surface of the toe board 10. The toe board cross member 40 and the toe board form a structure having a closed cross section as a part of a vehicle framework. The structure with a closed cross section extends in a widthwise direction of the vehicle. The toe board cross member 40 has a three dimensional shape for creating the structure with a closed cross section. In this embodiment, the toe board cross member 40 has an upper part 41 for making a closed cross section and a lower part 45 for making a dosed cross section so as to form two protruding parts which are spaced apart from each other approximately in a vertical direction. The upper part 41 for making a closed cross section and the lower part 45 for making a closed cross section are formed respectively by an upper member TB1 for forming a closed cross section and a lower member TB2 for forming a closed cross section. The upper member TB1 may be integral with the lower member TB2. Alternatively, the upper member TB1 and the lower member TB 2 may be separate members, which can be used, for instance, by welding the members TB1 and TB2.

As shown in FIG. 4, the above-mentioned upper part 41 has a cross section approximately in the form of a trapezoid. The upper part 41 is provided at a position where the front side frame 30 is in contact with the toe board 10. The upper part 41 protrudes from the toe board 10 toward a front part of the vehicle. A rear upper end of the front side frame 30 is connected to the toe board 10 at a position upper than the front side frame 30. The upper member TB1 includes an upper surface 42, a front surface 43 and a lower surface 44. Therein, the upper surface 42 is formed as a gradually inclined surface which downwardly extends toward the front part of the vehicle. The front surface 42 extends from a front edge of the upper surface 42 by being downwardly bent. In other words, the front surface 42 opposes a front surface of the vehicle. The lower surface 44 extends from a lower edge of the front surface 43 by bending in a rearward direction with respect to the vehicle. A rear lower end of the lower surface 44 is connected to the toe board 10. The upper part 41 extends beyond the notches 34 and the internal spaces of the front side frames 30. Then, both ends of the upper part 41, with respect to the width of the vehicle, are connected to both outer lateral walls 32 of the left and right front side frames 30. The upper member TB1 is provided so as to have both ends, with respect to a widthwise direction of the vehicle, between the front side frame 30 and the toe board 10.

On the other hand, the previously mentioned lower part 45 is provided at a position lower than the upper part 41 by extending from a lower edge of the lower surface 44 of the upper part 41. The lower part 45 has a cross section approximately in the form of a trapezoid by protruding from the toe board 10 toward a lower part of the vehicle. The lower member TB2 with a closed cross section includes a front surface 46, a lower surface 47 and a rear surface 48. Here, the front surface 46 protrudes obliquely from the toe board 10 toward the front lower part of the vehicle. The lower surface 47 extends from a lower edge of the front surface 46 along the bottom wall 31 of the front side frame 30 by being bent toward a rear part of the vehicle. The rear surface 48 extends from a lower edge of the lower surface 47 by bending in a rearward direction of the vehicle and is connected to the toe board 10. Both ends of the lower part 45, with respect to the width of the vehicle, are connected to the inner lateral walls 33 of the front side frames 30 at positions in the vicinity of or close to the front suspension member support 50.

Figure 6:
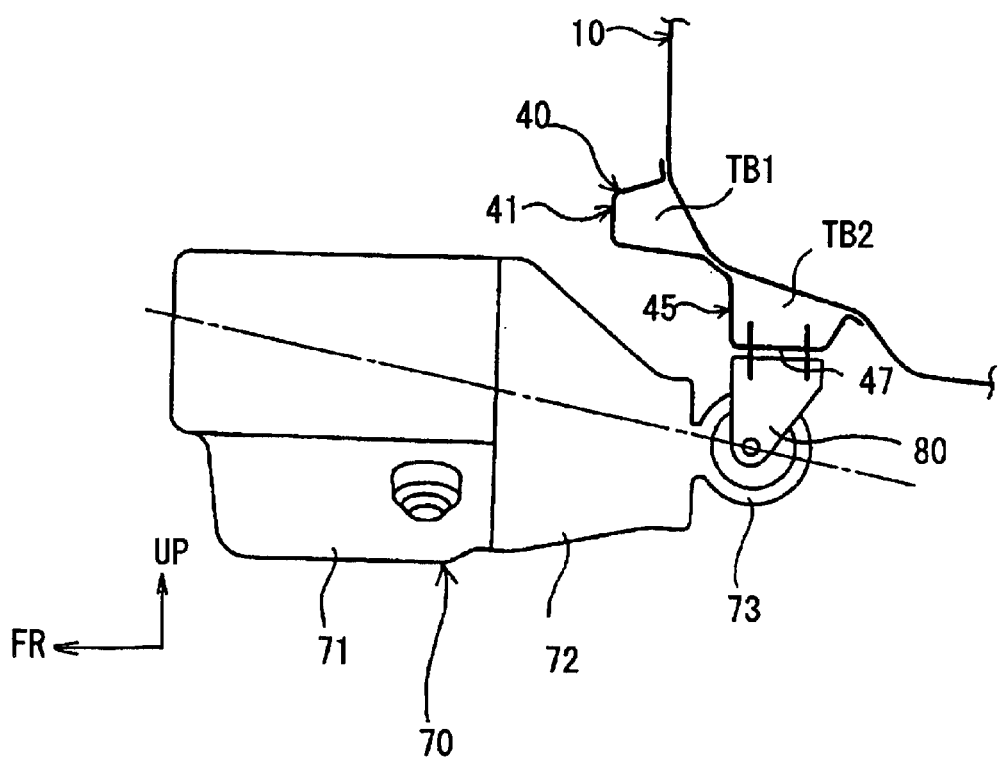
FIG. 6 is a partial diagram of the front structure shown in FIG. 1, which is seen in the direction of arrows Y-Y in FIG. 1.
Figure 7:
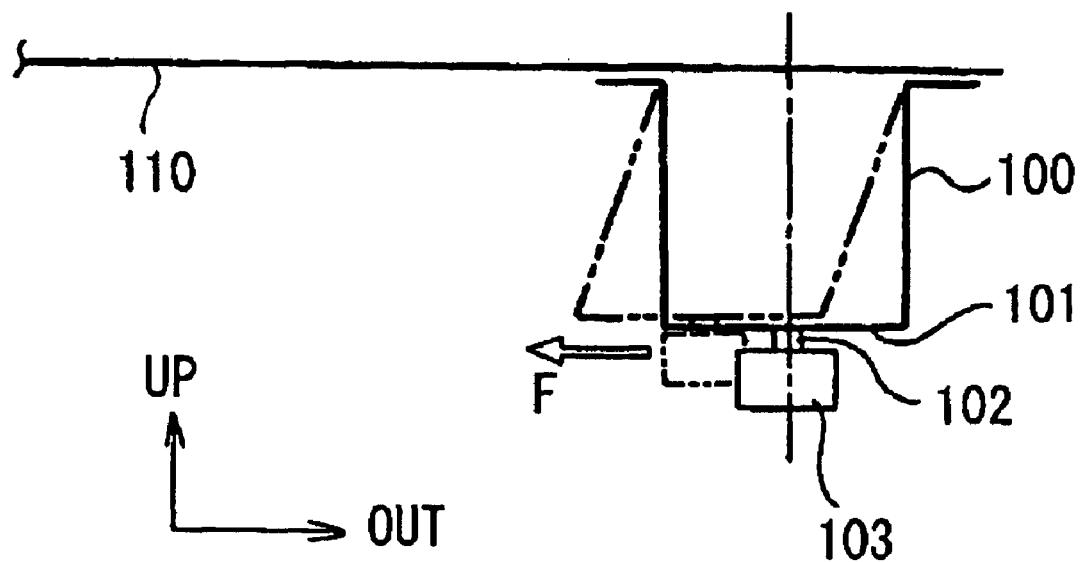
FIG. 7 is a vertical cross section for explaining a conventional front structure of a vehicle.

FIG. 6 is a partial diagram of the front structure shown in FIG. 1, which is seen in the direction of arrows Y-Y in FIG. 1. In the figure, a power unit 70 includes an engine 71 which is vertically placed in an engine compartment, and a transmission 72 provided behind the engine 71. Furthermore, a rear mount 73 is provided on a rear part of the transmission 72 and in the vicinity of a principal axis shown by a dashed line. The rear mount 73 is provided on the rear part of the power unit 70, for supporting the rear part of the power unit 70 on a front part 1 of the vehicle.

In addition to the above, a rear mount support 80 is provided approximately at a center position of the toe board cross member 40 with respect to the width of the vehicle, for supporting the rear part of the power unit 70. The rear mount support 80 is attached to the lower surface 47 of the lower part 45 with a closed cross section, and supports the rear mount 73 by suspending the same.

A vibration transmitted from the power unit 70 to lateral sides of the vehicle body via the rear mount support 80 is absorbed and distributed by the lower member TB2 by the above-mentioned configuration. Thus, it is possible to reduce noise generated by vibration.

According to the front structure of the vehicle having the above-mentioned structure, the upper member TB1 is provided so as to be interposed between the front side frame 30 and the toe board 10 at a position where the front side frame 30 contacts the toe board 10. Furthermore, the upper member TB1 connects the left and right front side frames 30 with each other. Therefore, an impact load applied from a front part of the vehicle is received by the upper member TB1. Hence, it is possible to prevent direct application of the impact load to the toe board 10.

Moreover, the toe board 10 is connected to the front side frames 30 over a long supporting span in a lengthwise direction of the vehicle. Therefore, it is possible to increase the supporting rigidity of the front side frames 30, especially on the surfaces which are brought into contact with the toe board 10. Consequently, the front parts of the front side frames 30 extend forwardly in a stable condition. Front free ends of the front side frames 30 are provided in predetermined positions without a substantial deviation. In the present invention, it is possible to accurately assemble the members.

Furthermore, a module containing, e.g., a radiator and a radiator panel is often provided in an engine compartment. Such module is preferably used since it makes the assembly easy. Usually, the radiator panel in the module has holes therein for being mounted to front side frames. In this case, the front side frames 30 can be smoothly and accurately fit to the holes of the module, since the front side frames 30 are accurately manufactured so as to fit the holes. When it is possible to use such module, an engine compartment can be neatly and speedily arranged.

Furthermore, the lower member TB2 having a closed cross section is connected to the left and right front side frames 30 in the vicinity of the front suspension member supports 50. Accordingly, the front structure of the vehicle of the present invention has an improved rigidity against a load applied in the widthwise direction of the vehicle. Hence, it is possible to prevent the front side frames 30 from being subjected to deformation of the cross sections in a widthwise direction. Namely, the front suspension members can be protected from a geometrical change. Consequently, a vehicle with an improved driving stability can be achieved by use of the front structure of the vehicle of the present invention.

In addition to the above, it is possible to use front suspensions and front suspension sub-frames instead of the above-mentioned front suspension members 60 and the front suspension member supports 50.

Furthermore, it is possible to connect the lower part 45 with a closed cross section to the front suspension member supports 50 so as to directly connect both ends of the lower part 45, with respect to the width of the vehicle, to the supports 50. In this case, higher rigidity can be achieved in comparison to the above-mentioned embodiment where both ends of the lower part 45 are connected to the parts in the vicinity of the front suspension member supports 50.

As explained above, a front structure of a vehicle according to the present invention has an improved rigidity of the front side frames especially around the front suspension member supports by the provision of a toe board cross member. As a result, it is possible to prevent the suspension member from deforming, and the driving stability of the vehicle can be increased.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A front structure of a vehicle comprising:
   a toe board extending in a widthwise direction of the vehicle, said toe board being provided in a front part of the vehicle for partitioning an engine compartment containing a power unit therein and a passenger compartment;
   a pair of front side frames provided by being spaced apart from each other in a widthwise direction of the vehicle, said front side frames extending in a lengthwise direction from a front part of the vehicle to a lower surface of a floor of the passenger compartment, said front side frames being downwardly bent when in contact with said toe board;
   a toe board cross member extending in a widthwise direction of said vehicle between said front side frames so as to connect said front side frames with each other, said toe board cross member and said toe board defining a structure having a closed cross section; and
   front suspension member supports provided on said front side frames, said toe board cross member extending to positions in the vicinity of said front suspension member supports.

2. The front structure of a vehicle as claimed in claim 1, wherein said toe board cross member comprises:
   an upper member forming a closed cross section extending in a widthwise direction of the vehicle, said upper member being interposed between said toe board and each of said front side frames at positions where said front side frames are brought into contact with said toe board; and
   a lower member forming a closed cross section extending in a widthwise direction of the vehicle at a position lower than said upper member, said lower member connecting said positions in the vicinity of said front suspension member supports to each other.

3. The front structure of a vehicle as claimed in claim 1, wherein: said toe board cross member supports a rear part of said power unit provided in the engine compartment.

4. The front structure of a vehicle as claimed in claim 2, wherein: said toe board cross member supports a rear part of said power unit provided in the engine compartment.

5. A front structure of a vehicle comprising:
   toe board extending in a widthwise direction of the vehicle, said toe board being provided in a front part of the vehicle for partitioning an engine compartment containing a power unit therein and a passenger compartment;
   a pair of front side frames provided by being spaced apart from each other in a widthwise direction of the vehicle, said front side frames extending in a lengthwise direction from a front part of the vehicle to a lower surface of a floor of the passenger compartment, said front side frames being downwardly bent when in contact with said toe board;
   a toe board cross member extending in a widthwise direction of said vehicle between said front side frames so as to connect said front side frames with each other, said toe board cross member and said toe board defining a structure having a closed cross section; and
   front suspension member supports provided on said front side frames, said toe board cross member connecting said front suspension member supports to each other.

6. The front structure of a vehicle as claimed in claim 5, wherein said toe board cross member comprises:
   an upper member forming a closed cross section extending in a widthwise direction of the vehicle, said upper member being interposed between said toe board and each of said front side frames at positions where said front side frames are brought into contact with said toe board; and
   a lower member forming a closed cross section extending in a widthwise direction of the vehicle at a position lower than said upper member, said lower member connecting said front suspension member supports to each other.

7. The front structure of a vehicle as claimed in claim 5, wherein said toe board cross member supports a rear part of said power unit provided in the engine compartment.

8. The front structure of a vehicle as claimed in claim 6, wherein said toe board cross member supports a rear part of said power unit provided in the engine compartment.

* * * * *